United States Patent [19]

West

[11] Patent Number: 5,093,471

[45] Date of Patent: Mar. 3, 1992

[54] NOVEL MESOGENIC AMINES AND LIQUID-CRYSTALLINE-SIDE-GROUP POLYMERS INCORPORATING SAME

[75] Inventor: John L. West, Monroe Falls, Ohio

[73] Assignee: Kent State University, Kent, Ohio

[21] Appl. No.: 447,582

[22] Filed: Dec. 7, 1989

Related U.S. Application Data

[63] Continuation-in-part of Ser. No. 267,242, Nov. 4, 1988, abandoned, which is a continuation-in-part of Ser. No. 180,215, Apr. 11, 1988, abandoned.

[51] Int. Cl.$^5$ .............. B32B 15/08; B32B 3/12; C09K 19/52
[52] U.S. Cl. .................. 528/418; 528/422; 528/407; 528/406; 528/117; 528/118; 528/119; 528/121; 528/124; 252/299.01; 428/1
[58] Field of Search ............. 252/299.01; 428/1; 528/418, 422, 407, 406, 117, 118, 119, 121, 124

[56] References Cited

U.S. PATENT DOCUMENTS

| | | | |
|---|---|---|---|
| 3,600,060 | 8/1971 | Churchill et al. | 350/350 R |
| 3,714,120 | 1/1973 | Labana et al. | 528/119 |
| 3,872,050 | 3/1975 | Benton et al. | 350/347 V |
| 3,935,337 | 1/1976 | Taylor | 252/299.01 |
| 4,048,358 | 9/1977 | Shanks | 428/1 |
| 4,101,207 | 7/1978 | Taylor | 252/299.01 |
| 4,228,029 | 10/1980 | Osman | 252/299.66 |
| 4,293,193 | 10/1981 | Labes et al. | 350/350 R |
| 4,316,003 | 2/1982 | Dante et al. | 528/407 |
| 4,435,047 | 3/1984 | Fergason | 350/334 |
| 4,596,445 | 6/1986 | Fergason | 350/339 F |
| 4,601,545 | 7/1986 | Kern | 350/347 V |
| 4,671,618 | 6/1987 | Wu et al. | 350/347 V |
| 4,673,255 | 6/1987 | West et al. | 350/347 V |
| 4,685,771 | 8/1987 | West et al. | 350/347 V |
| 4,688,900 | 8/1987 | Doane et al. | 350/347 V |
| 4,728,547 | 3/1988 | Vaz et al. | 428/1 |
| 4,757,130 | 7/1988 | DeMartino | 528/288 |
| 4,861,810 | 8/1989 | Dewhirst | 528/124 |
| 4,963,633 | 11/1990 | DeMartino et al. | 526/323.2 |

FOREIGN PATENT DOCUMENTS

| | | | |
|---|---|---|---|
| 156615 | 10/1985 | European Pat. Off. | 252/299.01 |
| 2139537 | 1/1973 | France | 252/299.01 |
| 0211799 | 7/1984 | German Democratic Rep. | 528/124 |
| 63-243165 | 10/1988 | Japan | 252/299.01 |
| 85/00397 | 9/1985 | PCT Int'l Appl. | 350/347 V |
| 86/01927 | 3/1987 | PCT Int'l Appl. | 350/347 V |

OTHER PUBLICATIONS

"New Display Based on Electrically Induced Index Matching in an Inhomogeneous Medium", Appl. Phys. Lett., vol. 40, No. 1 (Jan. 1, 1982).
"Synthesis, Structure and Properties of Liquid Crystalline Side Chain Polymers", Polymer Liquid Crystals (1982).
"Phase Studies of Liquid Crystalline Side Chain Polymers Mixed with Low Molar Mass Liquid Crystals of Similar Structure", Mol. Cryst. Liq. Cryst., vol. 89, pp. 23–36 (1982).
"Synthesis, Structure and Properties of Liquid Crystalline Polymers", Pure & Appl. Chem., vol. 57, pp. 1009–1014 (1985).
"Miscibility Studies of Polymeric and Low Molecular Weight Liquid Crystals and Their Behavior in an Electric Field", Makromol. Chem. Rapid Commun., vol. 3, pp. 745–751 (1982).
"Liquid Crystal Polymers", Thermotropic Liquid Crystals, pp. 145, 160–161 (Wiley & Sons, Chichester, 1987).
"Relationships between Molecular Structure and Immiscibility of of Liquid Crystal Side-Chain Polymers in Low Molecular Weight Nematic Solvents", Macromolecules, vol. 20, pp. 578–585 (Mar. 1987).
"Phase Separation of Liquid Crystals in Polymers", Mol. Cryst. Liq. Cryst., vol. 157, pp. 427–441 (Apr. 1988).
"DC-Induced Molecular Orientations of Liquid Crystalline Polysiloxanes Mixed with Low Molecular Weight Liquid Crystals", Mol. Cryst. Liq. Cryst., vol. 164, pp. 77–90 (Nov. 1988).

Primary Examiner—John S. Maples
Assistant Examiner—Richard Treanor
Attorney, Agent, or Firm—Watts Hoffmann Fisher Heinke (Abstract on next page.)

[57] ABSTRACT

Novel mesogenic amine curing agent for reactive monomers, such as epoxy resins and diisocyanates, comprises a mesogenic moiety, a primary amine, and a flexible alkyl spacer connected between the mesogenic moiety and the primary amine and wherein the alkyl spacer is a saturated, linear alkyl group having from about one to about twenty carbon atoms. Novel mesogenic amine has the formula:

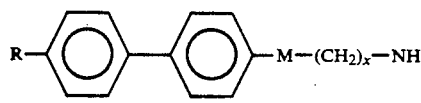

Formula I where M is —O—,

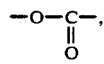

or —CH$_2$—,
where R is —NO$_2$ or —CN, and
where x is 1 to 20.

Novel mesogenic amine has a labile group subject to cross-linking and the formula:

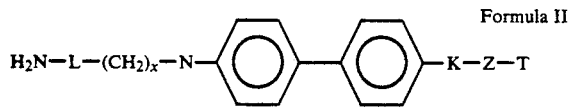

Formula II where K is

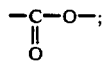

where L is

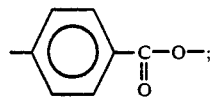

where M is —o—, $$-\overset{\overset{\displaystyle O}{\|}}{C}-O-,$$

or —CH$_2$—,
where Z is cinnamate, an alkene having from one to ten carbons, an isocyanate, an alkoxy, or an alcohol having from one to ten carbons,
where T is a cyano, a nitro or an alkyl group having from about one to ten carbons, and
where X is 1 to 20.

Novel mesogenic amine has a cinnamate group subject to cross-linking and the formula:

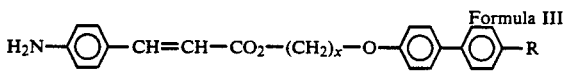

Formula III where R is —CN or —NO$_2$; and
where X is 1 to 20.

Novel mesogenic amine has a formula:

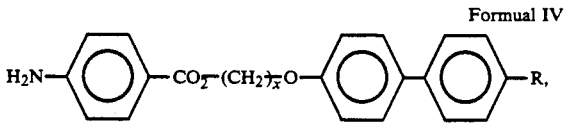

Formual IV where R is —CN or —NO$_2$; and
where x is 1 to 20.

(Abstract on next page.)

ABSTRACT

Novel mesogenic amine has a formula:

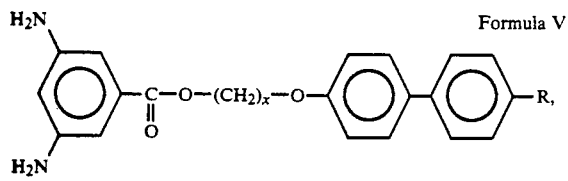

Formula V where R is —CN or —NO$_2$; and
where x is 1 to 20.

Novel mesogenic amine has a formula:

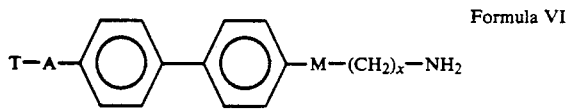

Formula VI where M is —O—,

—CH$_2$—;
where T is —CN, —NO$_2$ or C$_{1-10}$;
where A is a reactive group capable of cross-linking; and
where x is 2 to 20.

Reactive monomers having functionality of two or greater and mixtures thereof are cured with novel mesogenic amine curing agents or mixtures thereof.

Novel liquid-crystalline-side-group polymers with side group comprises a mesogenic moiety and a flexible alkyl spacer connecting the mesogenic moiety to the polymer backbone, and method for preparation thereto.

Blending of mesogenic amine curing agents and reactive monomers allow properties of the liquid crystal polymer to be tailored for specific applications, e.g., PCLC films.

10 Claims, 10 Drawing Sheets

<1>  Benzyl formate + Amino acid  →  1) NaOH sol  2) Acidification

<3>

1) 30% HBr in glacial acetic acid
2) 5% NaHCO₃ sol

DCC = 1,3 dicylcohexyl carbodiimide
DMAP = 4-dimethyl-aminopyridine p-TSA=p-toluene sulfonic acid
DMAP=dimethylformamide
TEA=triethylamine
X= 2 to 20

DMF=dimethyl formamide
TEA=Triethylamine
DMAP=4-dimethylaminopyridine
THF=Tetrahydrofuran
Q=Cl, Br
X= 2 to 20

DMF=dimethylformamide
TEA=triethylamine
DMAP=4-dimethylaminopyridine
THF=Tetrahydrofuran
Q=Cl, Br
X= 5 TO 20

NOVEL MESOGENIC AMINES AND LIQUID-CRYSTALLINE-SIDE-GROUP POLYMERS INCORPORATING SAME

RELATED APPLICATIONS

This application is a continuation-in-part of application Ser. No. 267,242, filed Nov. 4, 1988, no abandoned which is a continuation-in-part of application Ser. No. 180,215, filed Apr. 11, 1988, now abandoned.

BACKGROUND OF THE INVENTION

1. Field of the Invention

The present invention relates generally to liquid crystal technology, more specifically to novel mesogenic amines, and to novel liquid-crystalline-side-group polymer's wherein the novel mesogenic amine is incorporated into the polymer as a liquid-crystalline pendant group by virtue of the mesogenic amine's ability to polymerize reactive monomers by nucleophilic addition, such as epoxy resins or diisocyanates.

2. Description of the Related Art

Polymeric liquid crystals are known in the art. The general synthesis, structure, and properties of liquid crystalline polymers are discussed in 57 *Pure & Appl. Chem.* 1009 (1985) and in *Polymer Liquid Crystals*, Academic Press, Inc., 1982.

BRIEF DESCRIPTION OF THE INVENTION

The invention provides a novel mesogenic amine curing agent for reactive monomers comprising a mesogenic moiety connected to a terminal primary amine by way of a flexible alkyl spacer and having the structural formula:

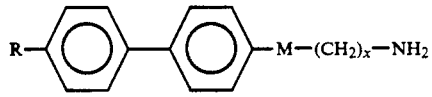

Formula I where M is —O—,

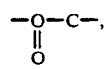

or —CH$_2$—; where R is —CN, or —NO$_2$; and x is from about 1 to about 20, preferably from about 5 to about 20.

In another embodiment, the invention provides a novel mesogenic amine curing agent for reactive monomers wherein the mesogenic moiety includes a labile group subject to cross-linking by known techniques; such as ultraviolet radiation, free radical reaction, thermal radiation and the like, and having the structural formula:

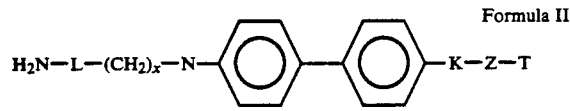

Formula II where K is

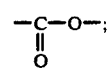

where L is

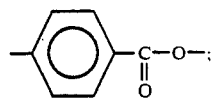

where M is —O—,

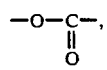

or —CH$_2$—;

where T is a cyano, a nitro, or an alkyl group having from one to ten carbons;

where Z is a reactive group capable of cross-linking, such as a cinnamate

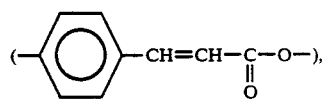

an alkene having from one to ten carbon atoms, an isocyanate, an alkoxy or an alcohol having from one to ten carbons. An isocyanate, an alkoxy, and an alcohol are included as groups to react with other additives, e.g., diisocyanates, diols and amines; and where x is from about 1 to about 20, preferably from about 5 to about 20.

In another embodiment, the invention provides a novel mesogenic amine curing agent for reactive monomers comprising a mesogenic moiety connected to a terminal primary amine by way of a flexible alkyl spacer and a cinnamate group, wherein the labile double bond group is subject to cross-linking by known techniques, such as ultraviolet radiation, free radical reaction, thermal radiation and the like, and having the structural formula:

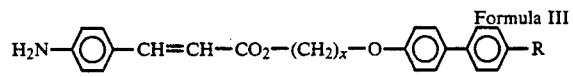

Formula III where R is —CH, or —NO$_2$; and
where x is from about 1 to about 20, preferably from about 5 to about 20.

In yet another embodiment, the invention provides a novel mesogenic amine curing agent for reactive monomers comprising a mesogenic moiety connected to a terminal primary amine by way of a flexible alkyl spacer and a benzoate group, and having the structural formula:

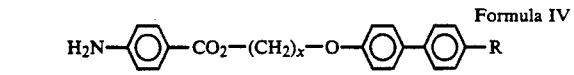

Formula IV where R is —CH, or —NO$_2$; and
where x is from about 1 to about 20, preferably from about 5 to about 20.

In still yet another embodiment, the invention provides a novel mesogenic amine curing agent, for reactive monomers comprising a mesogenic moiety connected to a phenyl diamine group by way of a flexible alkyl spacer, and having the structural formula:

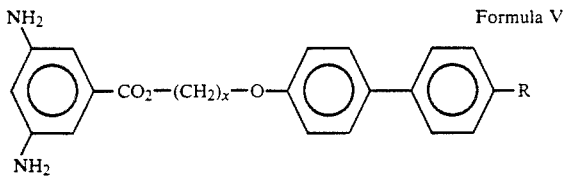

Formula V where R is —CH, or —NO$_2$; and
where x is from about 1 to about 20, preferably from about 5 to about 20. Reactive monomers cured with phenyl diamine mesogenic curing agents result in cross-linked polymers due to the availability of four active hydrogens from the two terminal primary amines.

In yet still another embodiment, the invention provides a novel mesogenic amine curing agent for reactive monomers in which the mesogenic moiety is connected to a primary amine by way of a flexible alkyl spacer, wherein the mesogenic moiety includes a labile group subject to cross-linking with another labile group by known techniques; such as ultraviolet radiation, free radical reaction, thermal radiation and the like; and having the structural formula:

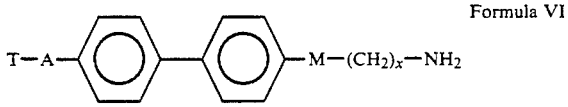

Formula VI where M is —O—,

or —CH$_2$—;
where T is a cyano, a nitro, or an alkyl group having from one to ten carbons;
where A is a reactive group capable of cross-linking, such as a cinnamate

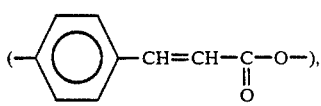

an alkene having from one to ten carbon atoms, an isocyanate, an alkoxy or an alcohol having from one to ten carbons. An isocyanate, an alkoxy, and an alcohol are included as groups to react with other additives, e.g., diisocyanates, diols and amines; and
where x is from 1 to about 20, preferably from about 5 to about 20.

The invention also provides novel liquid-crystal-line-side-group polymers formed by novel mesogenic amines or mixtures of the novel mesogenic amines curing uncured monomers or mixtures of monomers in a condensation reaction. The invention provides novel cross-linked liquid-crystalline-side-group polymers formed by novel mesogenic amines or mixtures of the novel mesogenic amines curing uncured difunctional or greater monomers in a condensation reaction. The invention provides novel cross-linked liquid-crystal-line-side-group polymers formed by novel mesogenic diamine curing agents curing monomers in a condensation reaction. The novel liquid-crystalline-side-group epoxies are useful in polymer dispersed liquid crystal (PDLC) light modulating materials having new and useful properties, as is disclosed in copending application Ser. No. 324,051, filed Mar. 20, 1989, which is a continuation-in-part application of Ser. No. 267,232, filed Nov. 4, 1988, which is a continuation-in-part application of Ser. No. 180,215, filed Apr. 11, 1988, the disclosures of which are incorporated by reference. When a polymer dispersed liquid crystal (PDLC) is prepared utilizing a liquid-crystal-line-side-group polymer wherein the pendant side group having a labile group capable of cross-linking, cross-linking is possible to maintain the orientation of the aligned mesogenic moieties.

When the novel mesogenic amines or mixtures of novel mesogenic amines are used to cure reactive monomers in order to make polymeric liquid crystals, the length of the alkyl spacer is important. The alkyl spacer should be long enough to allow the mesogenic moiety to respond to an applied field by aligning in a common direction. An alkyl spacer length of from about 1 to about 20 is satisfactory, and a length of from about 5 to about 20 is preferred. The mesogenic curing agents of the present invention are very simple to use in the condensation reaction with the reactive monomers as no purification of the liquid-crystalline-side-group polymer is necessary, i.e., no side products are produced. Additionally, a labile group may be provided so that the aligned mesogenic moieties may be cross-linked to fix the alignment, thereby imparting permanent alignment properties to the polymer. When the labile group is to be cross-linked by thermal energy, the temperature at which the cross-linking initiates should be higher than the temperature at which the condensation reaction between the amine and the monomer occurs and below the isotropic phase transition temperature of the resulting liquid crystal polymer.

DETAILED DESCRIPTION OF THE INVENTION

Figure 1A:
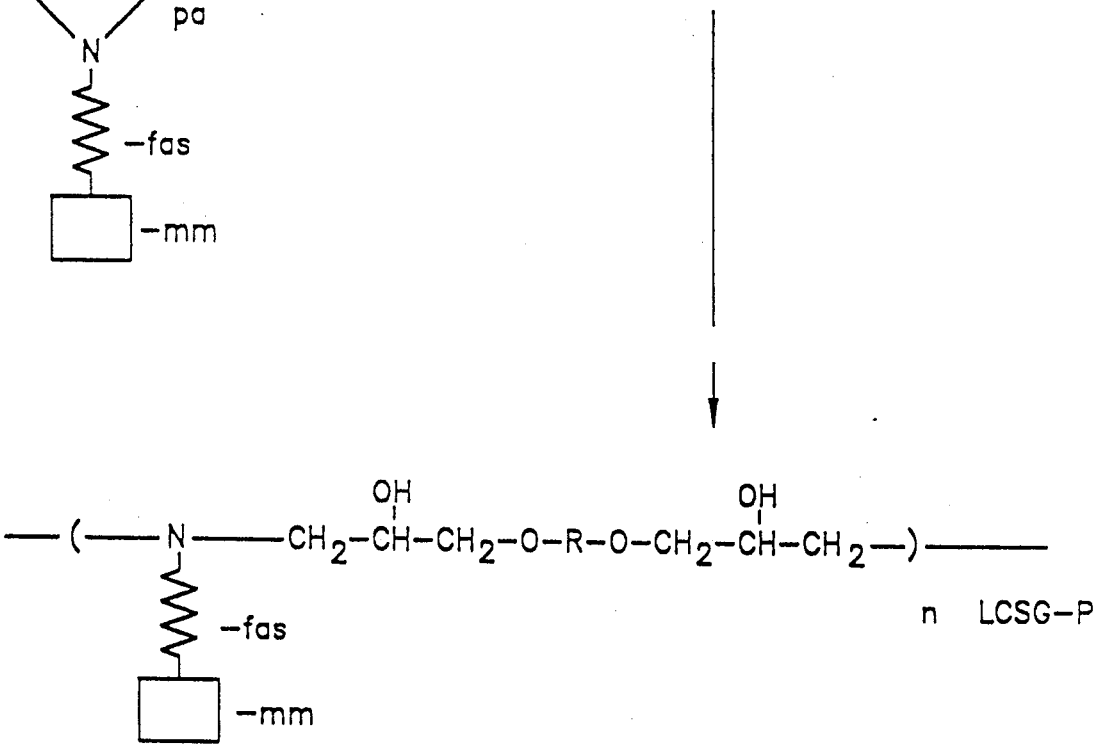
FIG. 1A is a schematic diagram of the general procedure for preparing a liquid-crystalline-side-group polymer using an epoxy resin.
Figure 1B:
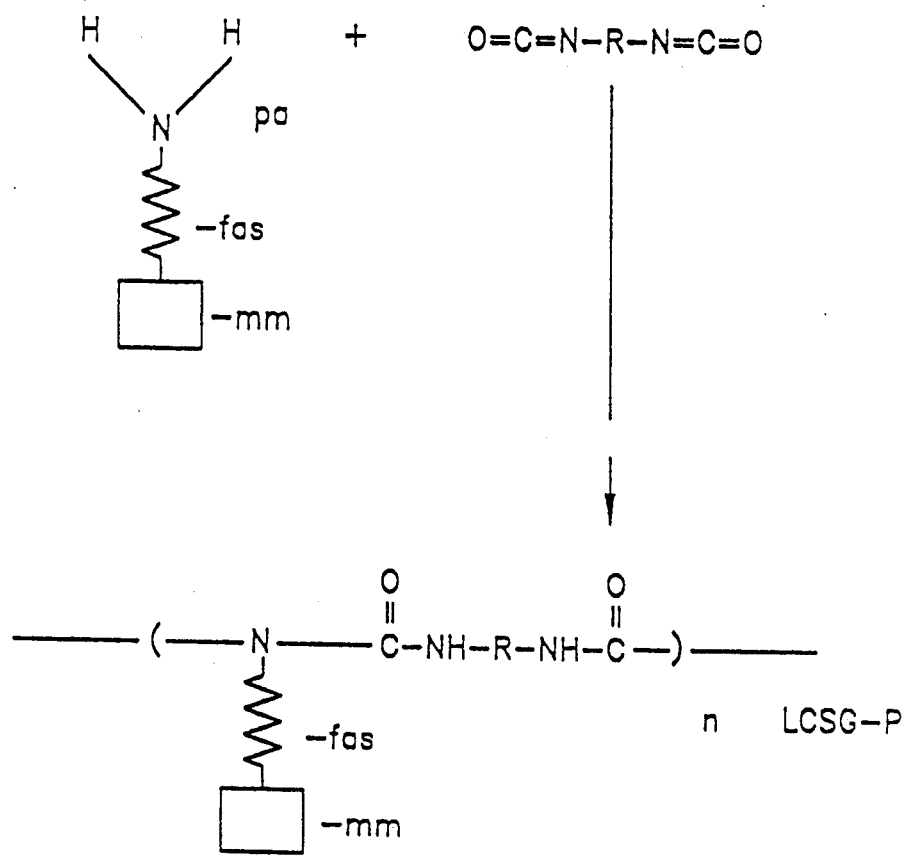
FIG. 1B is a schematic diagram of the general procedure for preparing a liquid-crystalline-side-group polymer using a diisocyanate.

FIGS. 1A and 1B outline the general procedure for the synthesis of liquid-crystalline-side-group polymers. A mesogenic curing agent made in accordance with the invention is depicted at MCA wherein mm is the mesogenic moiety, pa is the primary amine, and fas is the flexible alkyl spacer connected between the mesogenic moiety and the primary amine. R is defined in FIG. 1A as being any di-or higher functional epoxy resin and in FIG. 1B as being any di-or higher functional isocyanate, and by way of example R can be one of the following:

—$CH_2$—$C(CH_3)_2$—$CH_2$—,

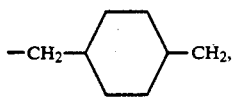

—$CH_2$—$(CH_2)_2$—$CH_2$—,

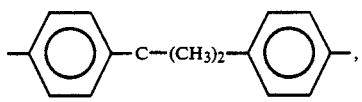

—$(CH_2)_g$— or benzene; and n is defined as the number of repeating units in the liquid-crystalline-side-group polymer, where n has a valve of from 3 to 500 and where g has a value of 1 to 10.

The flexible alkyl spacer is a saturated, linear alkyl group which allows the mesogenic moiety freedom of movement during and after the curing of the polymer. The flexible alkyl spacer may be from about 1 to about 20 carbon atoms long, preferably from about 5 to 20 carbon atoms long. An alkyl spacer length of ten carbon atoms is preferred because it seems to allow for a reasonable amount of decoupling of the motions of the polymer backbone and the mesogenic moiety (mm) thereby allowing the mesogenic moiety to align both during and after fabrication of the novel liquid-crystalline-side-group polymer.

In addition, a ten carbon alkyl spacer is preferred because it gives a reasonable liquid crystalline phase range for epoxies having a short distance between the ether groups in the polymer backbone. An examination of FIGS. 8A reveals a narrowing of the liquid crystalline phase when 100% x=5 is used compared to when 100% x=10 is used. In FIG. 8B there is no liquid crystalline phase when 100% x=5 is used. EGDE has two carbons between the ether groups whereas BDDE has four carbons.

In FIG. 1A the mesogenic amine reacts with the uncured epoxy resin in a condensation reaction to produce the novel liquid-crystalline-side-group polymer, LCSG-P, wherein the nitrogen is incorporated into the polymer backbone. The mesogenic amine curing agent must contain at least one primary amine. The liquid-crystalline-side-group epoxy resin wherein each side chain comprises a mesogenic moiety and a flexible alkyl spacer connecting the mesogenic moiety to the polymer backbone and wherein the flexible alkyl spacer is a saturated, linear alkyl group having from one to twenty carbon atoms. The liquid-crystalline-side-group polymer is formed of a mesogenic curing agent and an uncured epoxy resin by a condensation reaction. The liquid-crystalline-side-group polymer was prepared by mixing an equivalent weight ratio 1:1 of an uncured epoxy resin with a mesogenic curing agent. The mesogenic curing agent can be a mesogenic amine or a mixture of mesogenic amines. The uncured epoxy resin can be a mixture of epoxy resin monomers.

In FIG. 1B the mesogenic amine reacts with the diisocyanate in a condensation reaction to produce the novel liquid-crystalline-side-group polymer, LCSG-P, wherein the nitrogen is incorporated into the polymer backbone. The mesogenic amine curing agent must contain at least one primary amine. The liquid-crystalline-side-group polymer wherein each side chain comprises a mesogenic moiety and a flexible alkyl spacer connecting the mesogenic moiety to the polymer backbone and wherein the flexible alkyl spacer is a saturated linear alkyl group having from one to twenty carbon atoms. The liquid-crystalline-side-group polymer is formed of a mesogenic curing agent and a diisocyanate by a condensation reaction. The liquid-crystalline-side-group polymer was prepared by mixing an equivalent weight ratio 1:1 of a diisocyanate with a mesogenic curing agent. The mesogenic curing agent can be a mesogenic amine or a mixture of mesogenic amines. The uncured diisocyanate monomer can be a mixture of di-functional or higher isocyanate monomers.

EXAMPLE 1

Mesogenic amine curing agents having the formula:

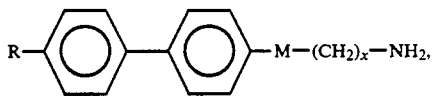

Formula I, where R is —CH, and M is

were prepared.

Figure 2:
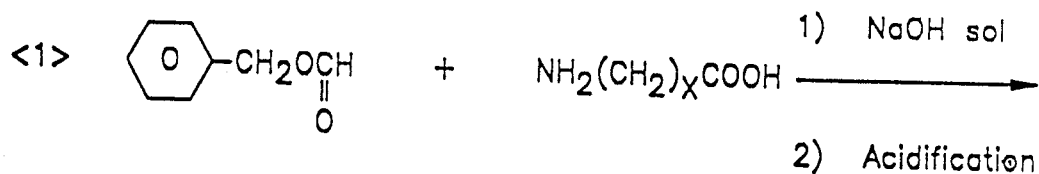
FIG. 2 is a schematic diagram of the synthetic procedure for mesogenic amines containing an ester group.
Figure 2:
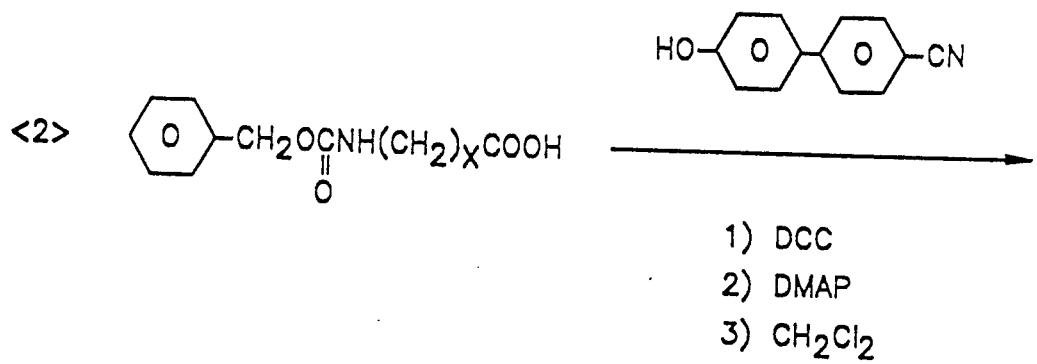
Figure 2:
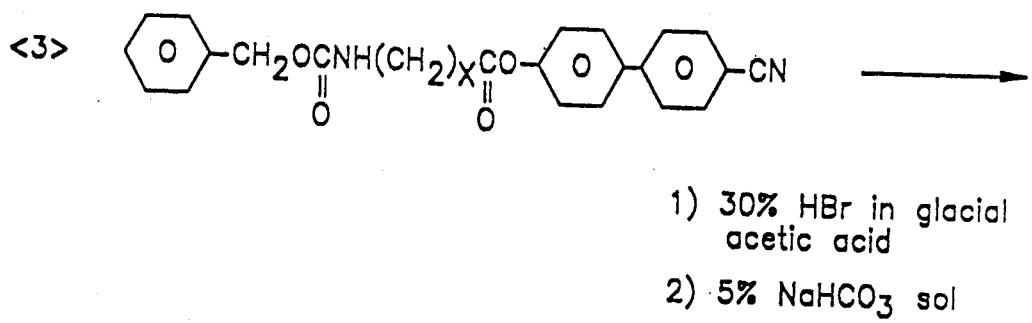
Figure 2:
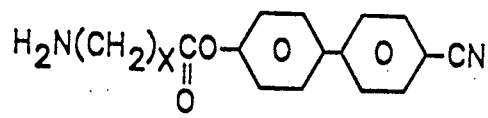

The synthetic procedure outlined in FIG. 2 for mesogenic amines wherein the mesogenic moiety is coupled to the alkyl spacer via an ester link was carried out to determine the effect of the flexible alkyl spacer length on the liquid crystal properties of the liquid-crystalline-side-group polymer. Two amino acids, one having X=5, and the other having x=10 were used according to this procedure.

In step 1, the amine group of the alkyl amino acid was protected by the addition of benzyl formate. The protection reaction was followed in step 2 by the esterification of the acid with 4'-cyanobiphenyl-4-ol. The dehydrating agents, 1,3-dicyclohexylcarbodiimide and 4-dimethylaminopyridine were added to assist in driving the reaction to completion. In step 3, the protective group was removed by the addition of 30% HBr in glacial acetic acid, followed by a neutralizing bath of sodium bicarbonate and recrystallization three times. The structure shown in FIG. 3 was confirmed by proton NMR.

EXAMPLE 2

The two mesogenic ester linked curing agents obtained in Example 1 were each combined with an uncured epoxy resin (MK 107, available from Wilmington Chemicals) in an equivalent weight ratio of 1:1. The curing agents were not readily soluble in the uncured epoxy resin at room temperature. The mixtures of curing agent and epoxy resin were heated to the melting point of the amine, which in the case of X=5 was 173° C. -175° C., and in the case of X=10, 163° C.-165° C., to form the respective homogeneous solutions. The polymerization reactions proceeded rapidly at these temperatures and gelation occurred within several minutes. Microscopic observation did not reveal any clear cut liquid crystalline phases in the matrix. Twenty percent E7 (low molecular weight eutectic mixture of cyanobiphenyls and a cyanoterphenyl) was dissolved in the liquid-crystalline polymer resulting in a polymer-E7 film showing liquid crystal phases.

The liquid-crystalline-side-chain polymer may not always show the liquid crystal phase properties. The liquid crystal phase may be induced with a low molecular weight liquid crystal additive so that when a polymer dispersed liquid crystal (PDLC) is produced utilizing the liquid-crystalline-side-group polymer a broader liquid crystal phase is obtained.

EXAMPLE 3

Figure 3:
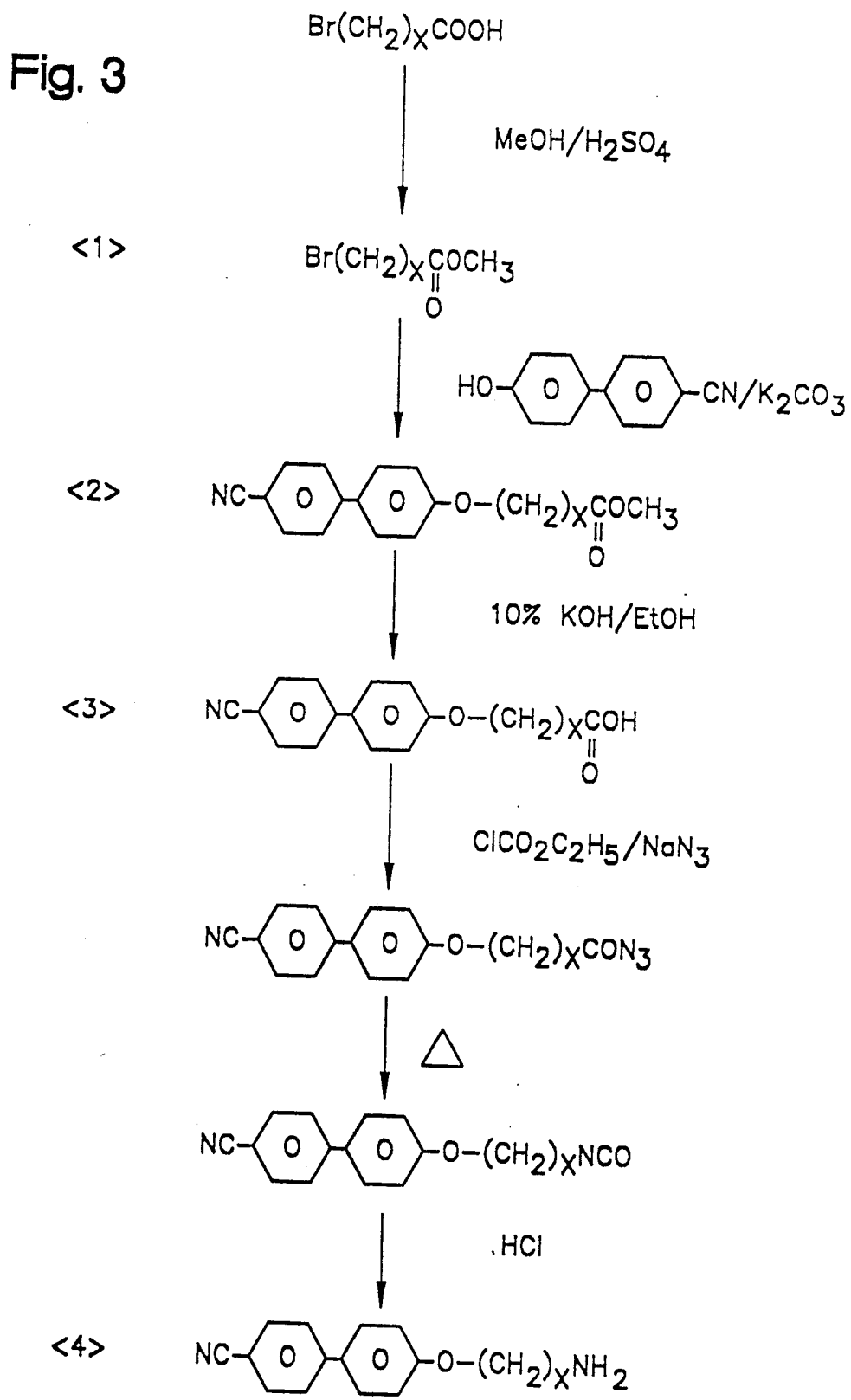
FIG. 3 is a schematic diagram of the synthetic procedure for mesogenic amines containing an ether group.

The procedure of FIG. 3 was carried out to synthesize two 4-cyanobiphenyl-4'-oxy (n-alkyl) amines where x equaled 5 and 10.

Synthesis of bromoalkyl ester a. Methyl 6-bromo-hexanoate 22 g (0.11 mole) of 6-bromohexanoic acid, 50 ml of methanol, and 3 ml concentrated sulfuric acid were mixed in a 100 ml flask and refluxed for 3 hours, after which period the excess methanol was removed by distillation. 100 ml water and 100 ml chloroform were added to the residue in the flask. The water layer was extracted with several 50 ml portions of chloroform; the portions were combined, washed with 5% sodium bicarbonate, and with water, and then passed through magnesium sulfate. The chloroform was removed by rotary evaporation. The crude product was vacuum distilled to yield greater than 90% methyl 6-bromo-hexanoate.

b. Methyl 11-bromoundecanoate 12.0 grams (45 mmole) of 11-bromoundecanoic acid was treated in the same manner as described above for 6-bromohexanoic acid to yield greater than 90% methyl 11-bromoundecanoate.

2. Synthesis of 4-cyanobiphenyl-4'-oxy-alkyl ester a. Methyl 4-cyanobiphenyl-4'-oxy-hexanoate 8.80 g (42 mmole) of methyl 6-bromohexanoate, 8.20 g (42 mmole) of 4-hydroxy-4'-cyanobiphenyl, 20 ml dimethyl formamide and 5.8 g (42 mmole) potassium carbonate were placed in a 100 ml flask equipped with a calcium chloride drying tube, and stirred at room temperature for 24 hours, after which time the mixture was poured into water and the suspended solids filtered out and washed with water. The resultant product was dried in a vacuum desiccator for 48 hours to yield 11.50 g (85%) of the ester which was recrystallized from aqueous ethanol to yield a product with a melting point of 80° C.-81° C.

b. 4-cyanobiphenyl-4'-oxy-undecanoate 10.8 g (39 mmole) of methyl 11-bromoundecanoate, 7.45 g (39 mmole) of 4-cyano-4'-hydroxy biphenyl in 20 ml of dimethyl formamide and 5.36 (39 mmole) of potassium carbonate were reacted as described above to yield 12.27 g (83%) of a recrystallized product having a melting point of 97° C.-98° C.

3. Hydrolysis of ester to obtain free acid a. 4-cyanobiphenyl-4'-oxy-hexanoic acid 6.11 g (19 mmole) of 4-cyanobiphenyl-4'-oxy-hexanoate, 11 g potassium hydroxide and 100 ml absolute ethanol were stirred at room temperature for 3 hours, after which time the mixture was poured into 300 ml ice water. The resultant solution was neutralized with hydrochloric acid. The solids were filtered out, washed with water, and dried in a vacuum desiccator for 48 hours. After recrystallization from absolute ethanol, the resultant product (70% yield) had a melting point of 165° C.

b. 4-cyanobiphenyl-4'-oxy-undecanoic acid 12.0 g (70 mmole) of 4-cyanobiphenyl-4'-oxy-undecanoate was reacted as described above to yield (68%) a product having a melting point of 116° C.-117° C.

4. Synthesis of 4-cyanobiphenyl-4'-oxy n-alkyl amine a. 4-cyanobiphenyl-4'-oxy-pentylamine 3.52 g (11 mmole) of 4-cyanobiphenyl-4'-oxy-hexanoic acid was dissolved in 100 ml tetrahydrofuran. 1.8 ml (12.5 mmole) triethylamine was added dropwise over a thirty minute period. The resultant solution was chilled in an ice-salt bath to about −5° C. to 0° C., and 1.2 ml (12.5 mmole) of ethyl chloroformate in 20 ml tetrahydrofuran was added slowly, maintaining the temperature at about −5° C. to 0° C. After the addition was complete, the mixture was stirred in the ice bath for one hour. A solution of 0.82 g (12.5 mmole) of sodium azide in 10 ml water was added dropwise over a thirty minute period to the cold mixture, after which the mixture was stirred for one hour. The solvent was removed by a rotary evaporator and the mixture was poured into 300 ml ice water and extracted with four 100 ml portions of toluene. The toluene portions were combined, washed with water, and dried over anhydrous magnesium sulfate. The dried toluene portion was refluxed for one hour. Evolution of nitrogen gas was observed during the refluxing. The toluene was removed by rotary evaporation. 20 ml of dry acetone was added to the dry isocyanate and the solution stirred in an ice-salt water bath. 10 ml of 8N hydrochloric acid solution was added dropwise. The solution was allowed to warm on a water bath with stirring until the evolution of carbon dioxide stopped. The solution was then poured into 300 ml ice water and neutralized with a 2.5N sodium hydroxide solution. The solid product was filtered, washed with water and dried in a vacuum desiccator for 48 hours. The crude product was recrystallized from absolute ethanol, yielding (55%) an amine with a melting point of 114° C.-115° C.

b. 4-cyanobiphenyl-4'-oxy-decylamine 3.34 g (8.8 mmole) of 4-cyanobiphenyl-4'-oxy-undecanoic acid was treated as described above with 1.35 ml (9.7 mmole) of triethylamine, 0.93 ml (9.7 mmole) ethyl chloroformate, and 0.63 g (9.7 mmole) sodium azide to yield (62%) of a recrystallized amine having a melting point of 99° C.-100° C.

EXAMPLE 4

Mesogenic amine curing agents having the formula:

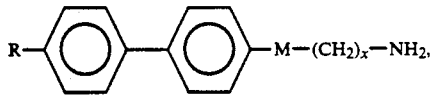

Formula I, where R is —CN and M is —O—, were prepared according to Example 3, wherein X=5, and X=10. The equivalent weight of the 10 carbon chain curing agent is 175 grams, and its melting temperature about 99° C.-100° C. The equivalent weight of the 5 carbon chain curing agent is 140 grams and its melting temperature about 114° C.-115° C. These curing agents were used to polymerize MK-107 (available from Wilmington Chemicals) WC 68 (available from Wilmington Chemicals), and EPON 828 (available from Miller-Stephenson Company) ethylene glycol diglycidyl ether (available from Alrich Chemical Company), and 1,4 butanediol diglycidyl ether (available from Alrich Chemical Company), in an equivalent weight ratio of 1:1 as follows: equivalent weights of the epoxy resin and the amine curing agent were weighed directly onto ITO coated glass. A few 26 μm spacers were tapped out onto the mixture. The mixture was heated for 1 minute and mixed well. Those mixtures employing a 5 carbon chain curing agent were heated to 125° C. Those mixtures with a 10 carbon chain curing agent were heated to 110° C. The mixtures formed clear, homogeneous solutions upon being heated and mixed for about a minute. A preheated ITO glass slide was then placed on top of each mixture to form a sandwich. The sandwiches were annealed at about 90° C. for 48 hours.

EXAMPLE 5

Figure 4:
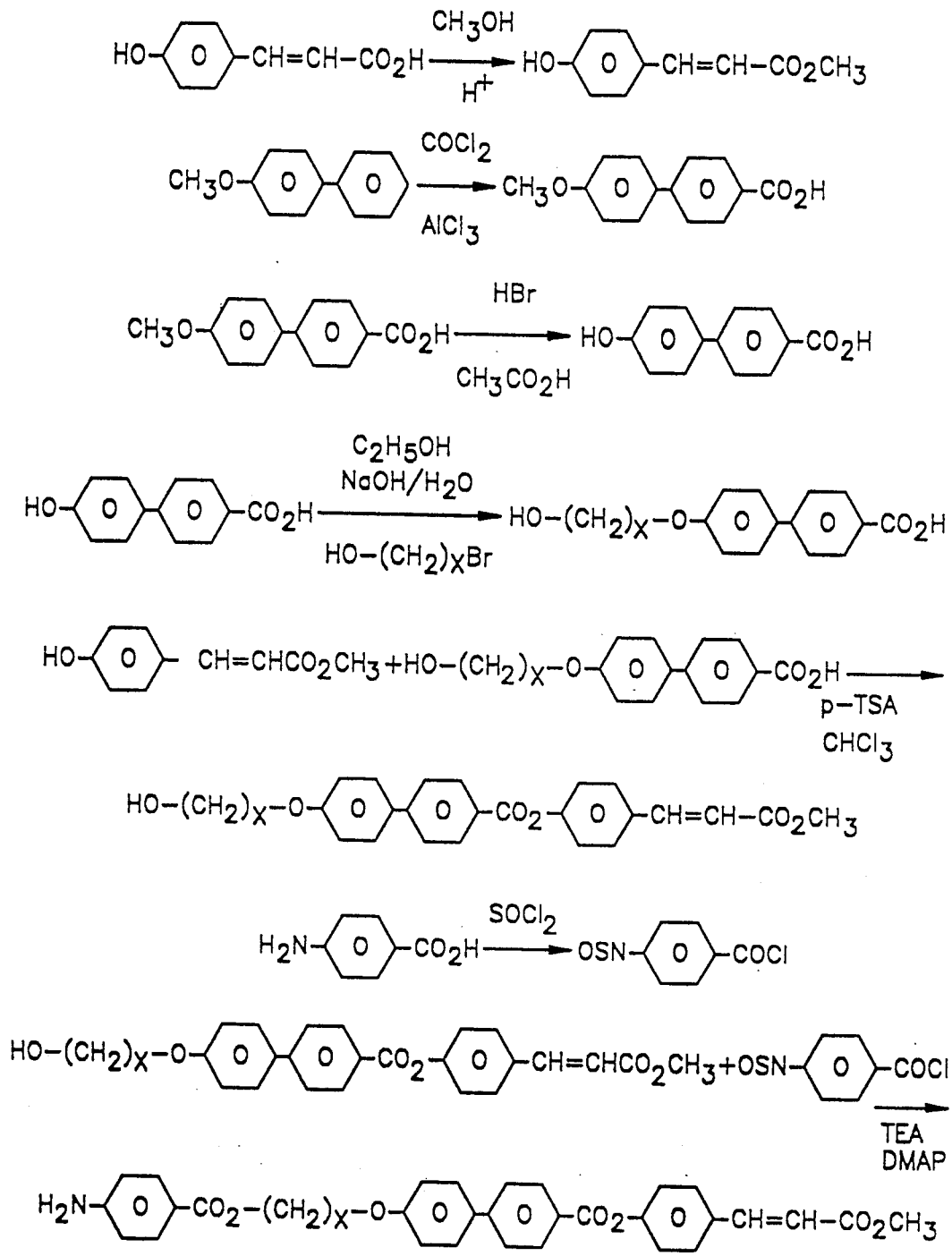
FIG. 4 is a schematic diagram of the synthetic procedure for mesogenic amines containing a terminal cinnamate group.

FIG. 4 represents the synthetic procedure utilized in the preparation of mesogenic amines containing a terminal cinnamate group according to Formula II.

EXAMPLE 6

Figure 5:
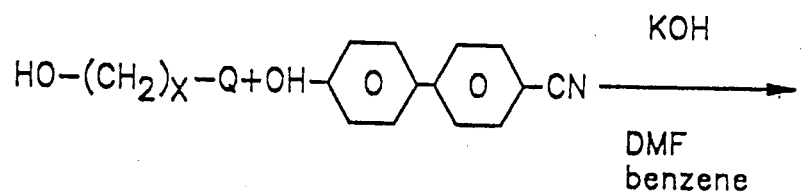
FIG. 5 is a schematic diagram of the synthetic procedure for mesogenic amines containing a cinnamate group adjacent to an amine.
Figure 5:
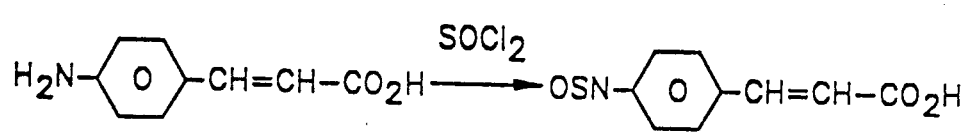
Figure 5:
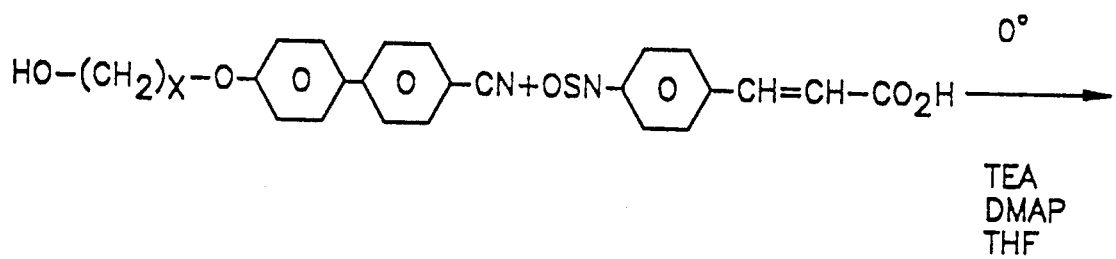
Figure 5:
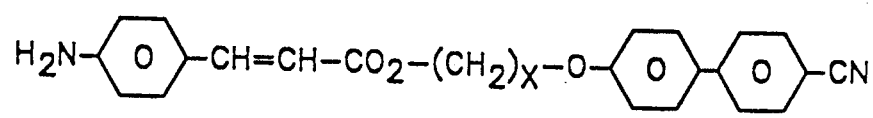

FIG. 5 indicates the synthetic procedure for the preparation of novel mesogenic amines containing a cinnamate group adjacent a primary amine according to Formula III.

EXAMPLE 7

Figure 6:
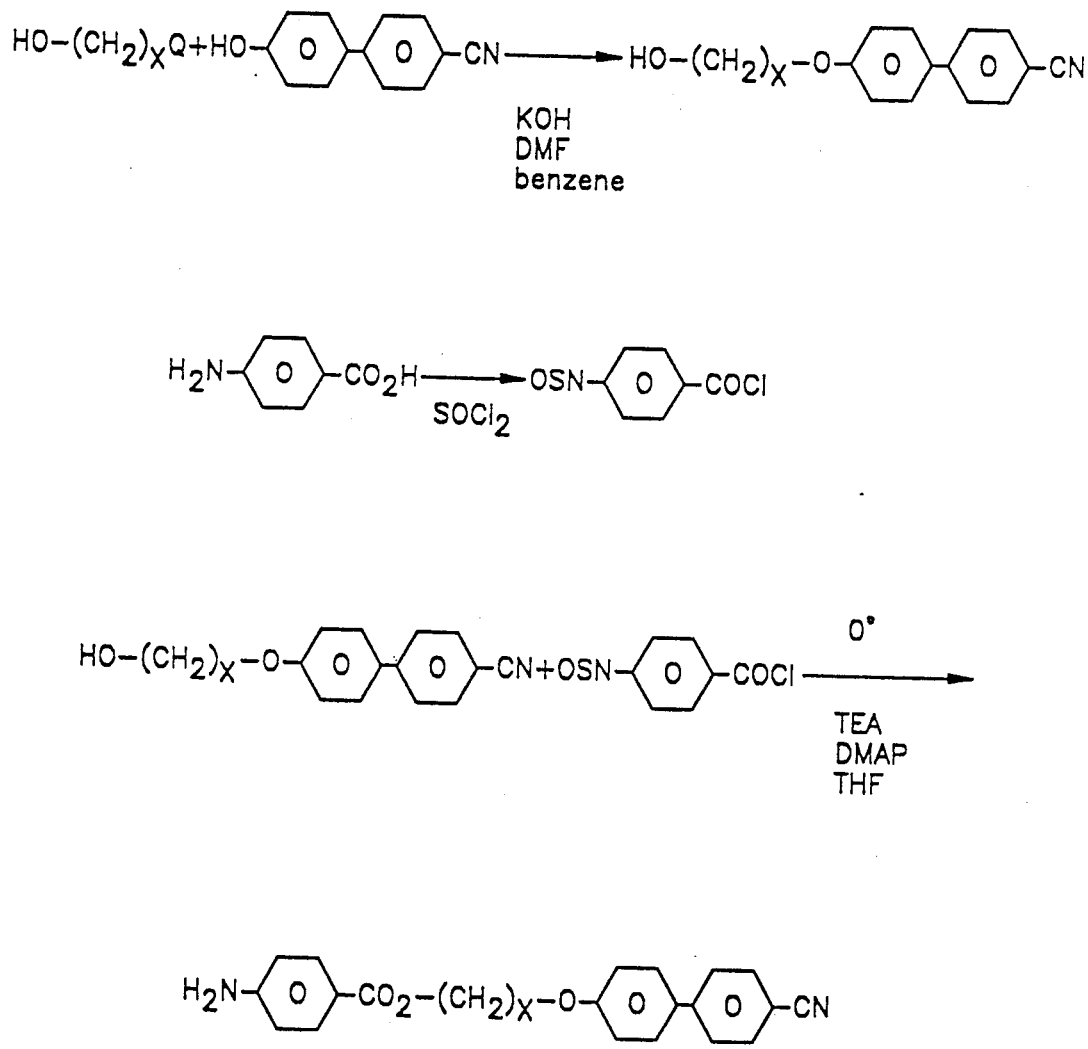
FIG. 6 is a schematic diagram of the synthetic procedure for mesogenic alkyl phenyl amines.

FIG. 6 indicates the synthetic procedure for the preparation of novel mesogenic amines in the form of a mesogenic moiety connected to a terminal primary amine by way of a flexible alkyl spacer and a benzoate group according to Formula IV.

EXAMPLE 8

Figure 7:
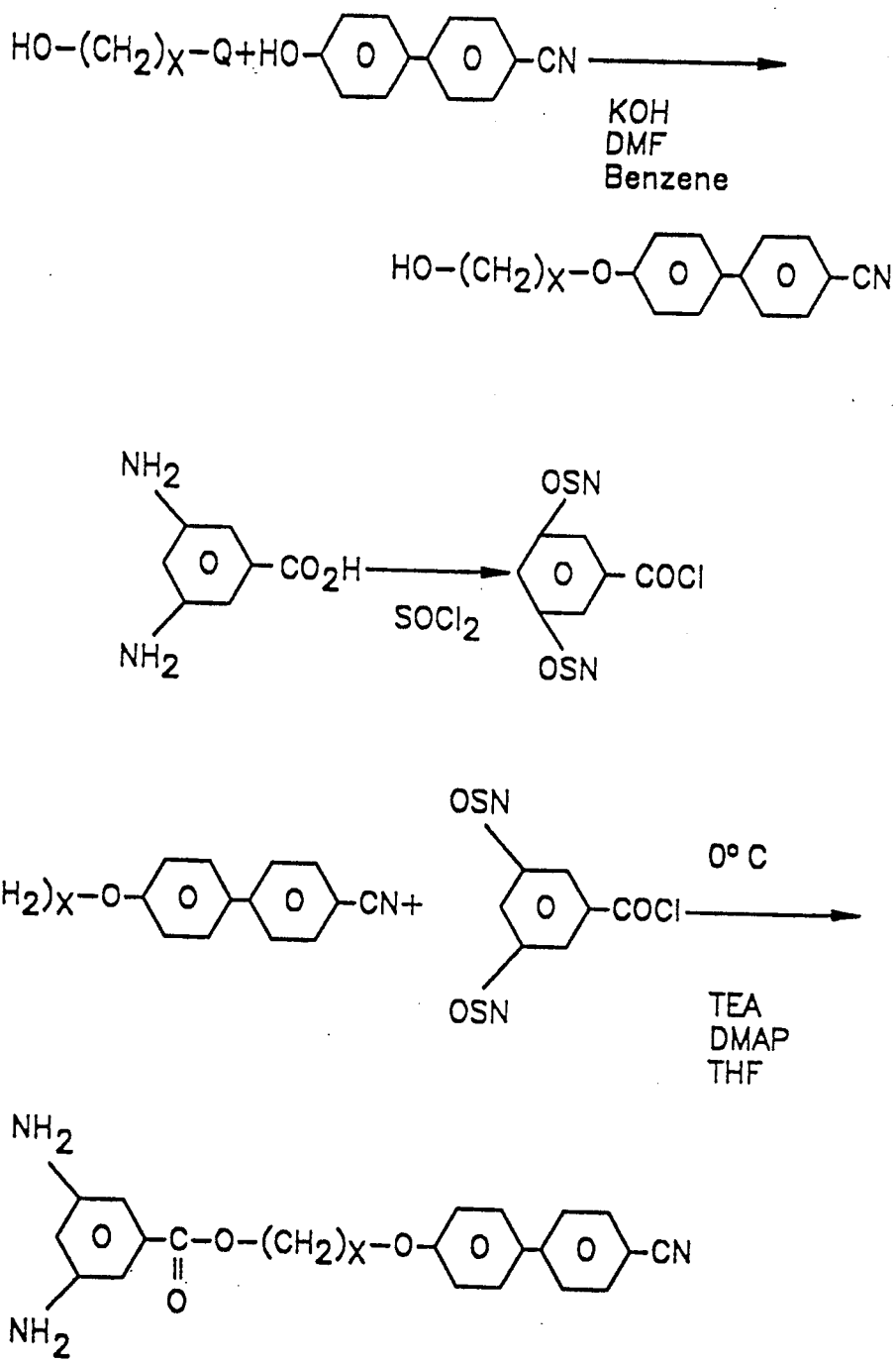
FIG. 7 is a schematic diagram of the synthetic procedure for mesogenic amines containing both an ether group and a phenyl diamine group.

FIG. 7 indicates the synthetic procedure for the preparation of novel mesogenic amines in the form of a mesogenic moiety connected to a phenyl diamine group by way of a flexible alkyl spacer according to Formula V.

EXAMPLES 9-19

The following examples indicate the synthesis of liquid-crystalline-side-group polymers utilizing mixtures of mesogenic amines, having variations in the length of the alkyl space.

Ethylene glycol diglycidyl ether (EGDE), 1,4 butanediol diglycidyl ether (DBBE) and Epon 828 were the uncured epoxy resins cured by the mesogenic amine curing agent. Mesogenic amines having the formula:

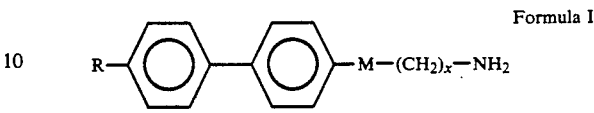

Formula I where R is —CH,
where M is —O—, and
where x is 5 and x is 10 were prepared. The epoxies were formed by mixing equivalent weights of the mesogenic amines and one of several epoxy resins as shown in Table I. The mixtures were heated to 120° C. resulting in melting of the mesogenic curing agent and polymerization.

Figure 8A:
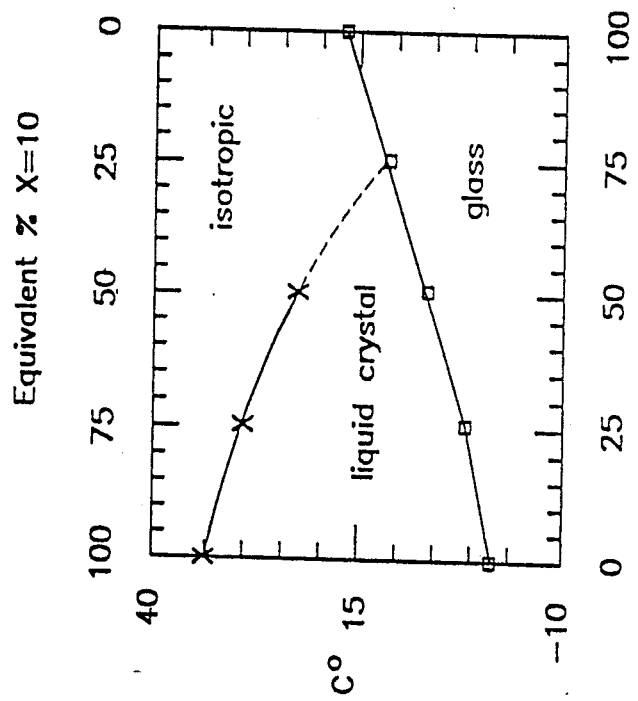
FIGS. 8 (A and B) are graphs of phase transition temperatures for EGDE(A) and BDDE(B), cured with different equivalent ratios of 4-cyanobiphenyl, -4'-alkoxy amine, where X is 5 or 10.
Figure 8B:
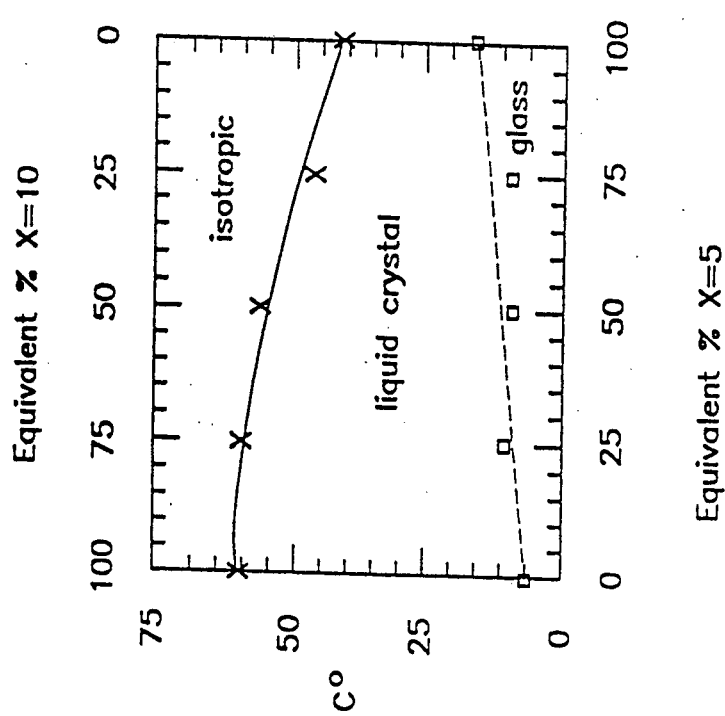

FIGS. 8A and 8B are phase transition graphs. The phase behavior of the resulting epoxies were determined using optical microscopy and differential scanning calorimetry. Table I indicates the composition and the phase transition temperatures of the liquid-crystalline-side-group polymer and how the mesogenic curing agent allow the properties of the liquid-crystalline-side-group polymer to be tailored for specific applications. The liquid crystalline phase has been tentatively identified as nematic from optical microscopy. The isotropic phase transition temperature decreases smoothly as the x=5 ratio is increased, allowing precise control of the phase transition temperature. The x=5 ratio is the equivalent percent of x=5 to x=10 to formulate the mesogenic curing agent fraction of the reaction mixture. In FIG. 8, the $T_g$ of the polymers increases as the x=5 ratio increases. Extrapolation of the isotropic phase transition for the BDDE epoxy, FIG. 8B, to higher x=5 ratios shows the transition falls below $T_g$, explaining the lack of a mesogenic phase at or above 75%.

The separation of the mesogenic groups of the polymer backbone is controlled by the epoxy resin utilized. EGDE provides a two carbon spacer, BDDE a four carbon spacer and Epon 828 a bisphenol A spacer. Increasing the spacer length by two carbons results in a decrease in both Tg and the isotropic phase transition temperature. The bisphenol A spacer of Epon 828 provides too large of a separation between the mesogenic groups to observe a liquid crystalline phase. Also the rigidity of the bisphenol A backbone greatly increases the Tg of the polymer.

TABLE I

| Composition and Transition Temperatures of Mesogenic Epoxies | | | | |
|---|---|---|---|---|
| Example | Epoxy Resin | X 10* | X 5* | $T_g$ °C. | N-I °C. |
| 9 | EGDE | 1.00 | 0.00 | 5 | 61 |
| 10 | EGDE | 0.75 | 0.25 | 10 | 60 |
| 11 | EGDE | 0.50 | 0.50 | 9 | 55 |
| 12 | EGDE | 0.25 | 0.75 | 9 | 45 |
| 13 | EGDE | 0.00 | 1.00 | 16 | 42 |
| 14 | BDDE | 1.00 | 0.00 | −2 | 35 |
| 15 | BDDE | 0.75 | 0.25 | 1 | 30 |
| 16 | BDDE | 0.50 | 0.50 | 7 | 22 |
| 17 | BDDE | 0.25 | 0.75 | 12 | |
| 18 | BDDE | 0.00 | 1.00 | 17 | |
| 19 | Epon 828 | 1.00 | 0.00 | 44 | |

*equivalent cure agent/equivalent epoxy resin

EXAMPLES 20-22

The following examples indicate the synthesis of cross-linked liquid-crystalline-side-group polymers utilizing trifunctional epoxy resins and a mesogenic amine. Cross-linking through the backbone of the polymer will lock in the orientation of the mesogenic moiety. The cross-linking of liquid-crystalline-side-group polymers allows for the preparation of thermoset polymers.

Triglycidyl ether of trimethylol propane (WC97) and triglycidyl ether of trimethylol ethane (WC98) were the trifunctional epoxy resins cured by the mesogenic amine having the formula:

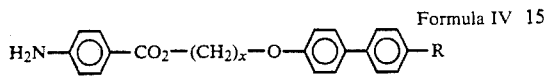
Formula IV where R is —CH, and where x is 8.

The epoxies were formed by mixing one equivalent weight of the mesogenic amine and one weight per epoxide of the epoxy resins as shown in Table II. A non-cross-linked liquid-crystalline-side-group polymer was prepared utilizing ethylene glycol diglycidyl ether (EGDE). The mixtures were heated to 100.C resulting in the melting of the mesogenic curing agent and polymerization.

Table II

Table II indicates the composition and the phase transition temperature of the cross-linked liquid-crystalline-side-group polymers and the non-cross-linked liquid-crystalline-side-group polymer. The phase behavior of the resulting epoxies were determined using optical microscopy. EGDE provides a two carbon spacer and WC 97 a three carbon spacer. Increasing the spacer length between the side chains of EGDE and WC 97 decreased the phase transition temperature.

TABLE II

| | Composition and Transition Temperatures of Mesogenic Epoxies | | | | |
|---|---|---|---|---|---|
| Example | Formula 6 | EGDE | WC97 | WC98 | S(N)-I |
| 19 | 0.0165 g | 0.0058 g | | | 65-66° C. |
| 20 | 0.0054 g | | 0.0034 g | | 53-54° C. |
| 21 | 0.0055 g | | | 0.0044 g | no phase separation |

EXAMPLE 23

The following example indicates the synthesis of a liquid-crystalline-side group polymer utilizing a mesogenic amine curing agent having a nitrobiphenyl group included in the mesogenic moiety.

Ethylene glycol diglycidyl ether (EGDE) was the epoxy resin cured by the mesogenic amine having the structural formula:

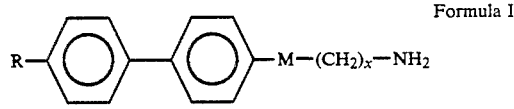
Formula I where R is —$NO_2$, where M is —O— and where x is 7.

0.0112g., $6.8 \times 10^{-5}$ equivalents, of the mesogenic amine curing agent and 0.0058g., $6.8 \times 10^{-5}$ equivalents, of EGDE were weighed out onto a conducting glass slide to which 18 μm spacer were added. The mixture was stirred with a spatula while being heated on a hotplate. When the mixture became clear a second conducting slide was placed on top and the resulting sandwich clamped. The sandwich was cured in a 135° C. oven for 24 hours. The optical microscope showed the nematic isotropic transition temperature to be 67° C.–68° C.

EXAMPLE 24

The following example indicates the synthesis of a liquid-crystalline-side group polymer utilizing a mesogenic amine curing agent having a phenylamine group included in the mesogenic moiety.

1, 6 hexane diisocyanate was the reactive monomer polymerized by the mesogenic amine having the formula:

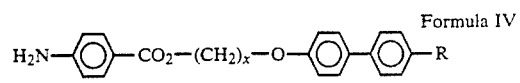
Formula IV where R is —CN; and where x is 8.

0.026g. of the mesogenic amine curing agent and 0.0103g. of the 1, 6 hexane dissocyanate were weighed out on a glass slide and mixed to a paste. The paste was heated to 120° C. forming a clear homogeneous solution. 18 μm spacers and a cover slip were added. The sandwich was heated in a 120° C. oven overnight. The optical microscope revealed a liquid crystal to isotropic transition temperature of approximately 165° C. for the resulting polymer.

Figure 9:
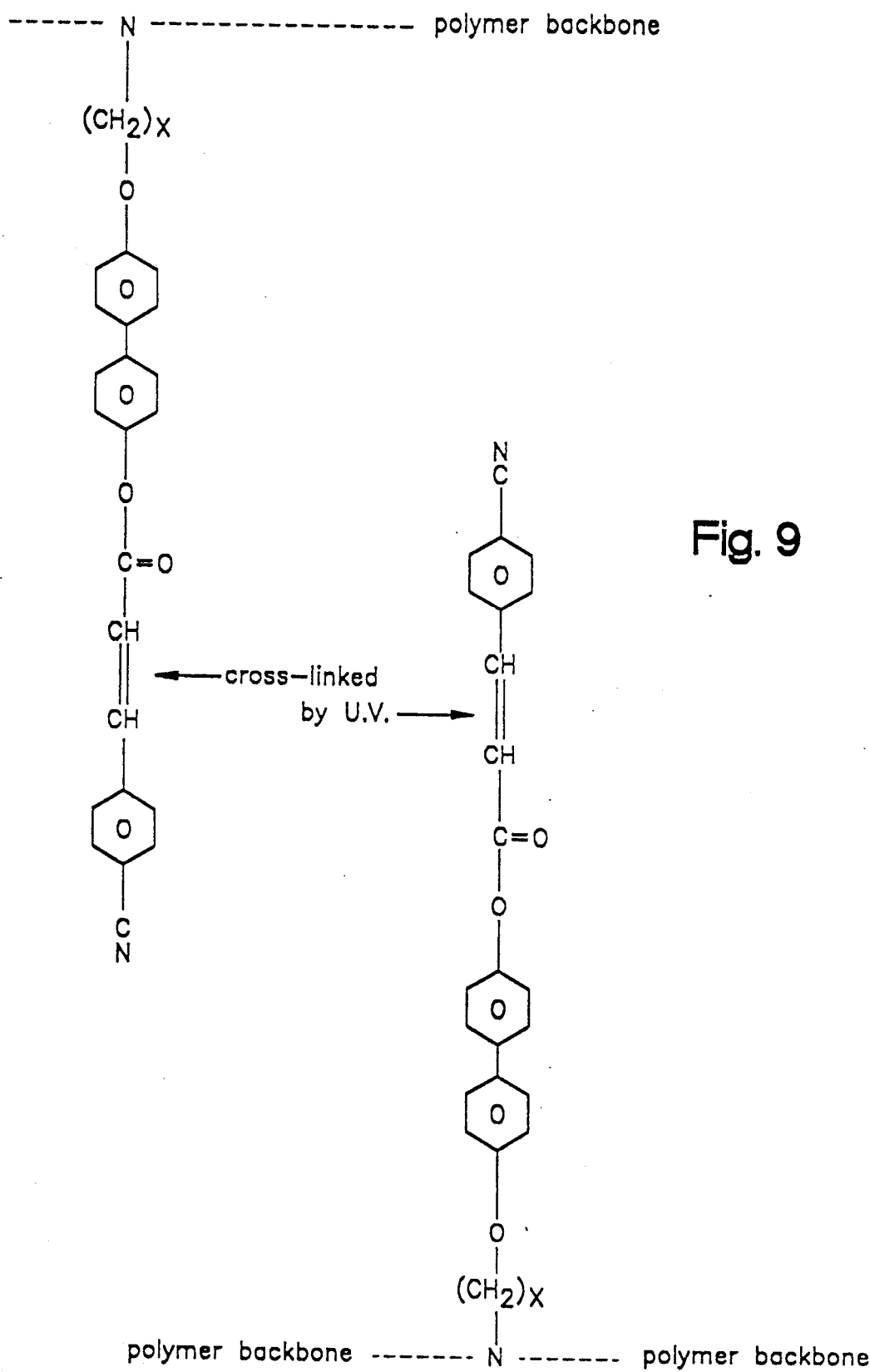
FIG. 9 is a schematic diagram of aligned mesogenic amines in cured epoxies having the labile groups positioned for cross-linking.

FIG. 9 illustrates the orientation of two liquid-crystalline-side-group polymers wherein each pendant liquid crystal side chain has a double bond available for cross-linking by ultraviolet radiation. The cross-linking of two polymers locks in the alignment of the mesogenic moiety and broadens the liquid crystalline phase.

Mesogenic curing agents can be used to polymerize any epoxy resin of functionality 2 or greater and any di-and higher isocyanate. Mesogenic curing agents having two or more primary amine groups are utilized for cross-linking polymers. Mixtures of uncured reactive monomers can be cured by mesogenic curing agents. Mixtures of mesogenic amines can be utilized to cure uncured reactive monomers. The trifunctional or greater epoxy resins and triisocyanates can be utilized to provide cross-linked polymers.

Suitable difunctional and trifunctional epoxy resins are by way of example and not limited to this structural formula:

where R may be —$CH_2$—$C(CH_3)_2$—$CH_2$—,

—$CH_2$— $(CH_2)_2$ —$CH_2$, —$(CH_2)_8$—,

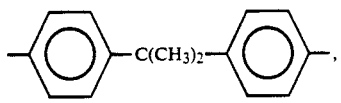

or benzene, or a combination thereof, where g is 1 to 10. Other suitable resins are triglycidyl ether of trimethylol ethane (having the tradename WC 98) and triglycidyl ether of trimethylol propane (having the tradename WC 97). Suitable diisocyanates are by way of example and not limited to this structural formula:

where R may be $-CH_2-C(CH_3)_2-CH_2-$,

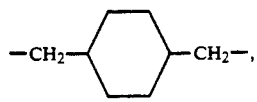

$-CH_2-(CH_2)_2-CH_2$, $-(CH_2)_g-$,

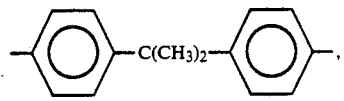

or benzene, or a combination thereof, where g is 1 to 10.

MK 107 is the trade name for 1,4-cyclohexanedimethanol diglycidyl ether. WC 68 is the trade name for neopentyl-glycol-diglycidyl ether. Epon 828 is the trade name for the reaction product of bisphenol A and an excess of epichlorohydrin.

E7 is the trade name for a nematic liquid crystal which consists of 4′-n-pentyl-4-cyanobiphenyl, 51% by weight; 4′-n-heptyl-4-cyanobiphenyl, 21%; 4′n-octoxy-4-cyanobiphenyl, 16%; and 4′-n-pentyl-4-cyanoterphenyl, 12% (available from EM Industries).

Many modifications and variations of the invention will be apparent to those skilled in the art in the light of the foregoing disclosure. Therefore, it is to be understood that, within the scope of the appended claims, the invention can be practiced otherwise than has been specifically shown and described.

I claim:

1. A liquid-crystalline-side group polymer formed by the reaction of a mesogenic amine curing agent and an uncured epoxy resin; wherein said mesogenic amine curing agent comprises a mesogenic moiety, a primary amine, and a flexible alkyl spacer connected between said mesogenic moiety and said primary amine wherein said flexible alkyl spacer is a saturated, linear alkyl group having from one to twenty carbon atoms.

2. A liquid-crystalline-side-group polymer according to claim 1, wherein the mesogenic amine curing agent comprises a species having the structural formula:

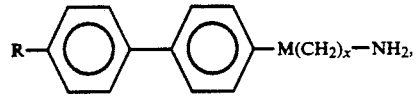

wherein M is one of the following groups:

$-O-$, $-O-\underset{\underset{O}{\|}}{C}-$, or $-CH_2-$;

where R is $-CH$, or $-NO_2$; and
where x is from 5 to 20.

3. A liquid-crystalline-side-group polymer according to claim 1, wherein the mesogenic amine curing agent comprises a species having the structural formula:

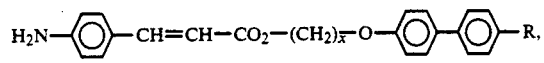

where R is $-CH$, or $-NO_2$; and
where x is from 5 to 20.

4. A liquid-crystalline-side-group polymer according to claim 1, wherein the mesogenic amine curing agent comprises a species having the structural formula:

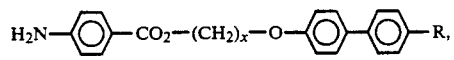

where R is $-CH$, or $-NO_2$; and
where x is from 5 to 20.

5. A liquid-crystalline-side-group polymer according to claim 1, wherein the mesogenic amine curing agent comprises a species having the structural formula:

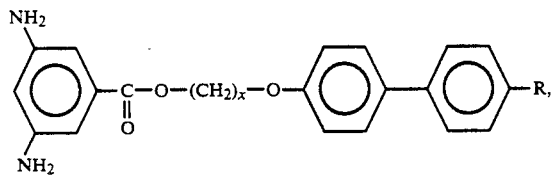

where R is $-CH$, or $NO_2$; and
where x is from 5 to 20.

6. A liquid-crystalline-side-group polymer according to claim 1, wherein the mesogenic amine curing agent comprises a species having the structural formula:

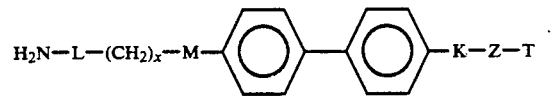

where K is

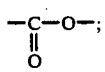

where L is

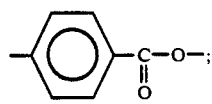

where M is $-O-$

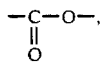

or —CH$_2$—;

where T is —CN, —NO$_2$, or C$_{1-10}$;

where Z is a cinnamate, an alkene having from one to ten carbons, an isocyanate, an alkoxy, or an alcohol having from one to ten carbons; and where x is 5 to 20.

7. A liquid-crystalline-side-group polymer according to claim 1, wherein the mesogenic amine curing agent comprises a species having the structural formula:

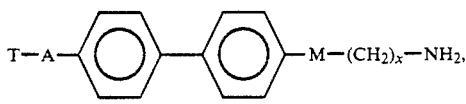

where M is —O—,

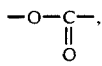

or —CH$_2$—;

where T is a cyano, a nitro, or an alkyl group having from one to ten carbons;

where A is a cinnamate, an alkene having from one to ten carbons, an isocyanate, an alkoxy, or an alcohol having from one to ten carbons; and where x is from about 5 to about 20.

8. A liquid-crystalline-side-group polymer according to claim 1, wherein said uncured epoxy resin is a diglycidyl ether, a triglycidyl ether, the reaction product of bisphenol A and an excess of epichlorohydrin, or a combination thereof.

9. A liquid-crystalline-side-group polymer according to claim 8, wherein said uncured epoxy resin being at least one member selected from the group consisting of a diglycidyl ether of 1,4 butanediol, a diglycidyl ether of neopentyl glycol, a diglycidyl ether of cyclohexane dimethanol, a diglycidyl ether of resorcinol, a diglycidyl ether of ethylene glycol, a triglycidyl ether of trimethylol propane, and a triglycidyl ether of trimethylol ethane.

10. A liquid-crystalline-side-group polymer according to claim 1, wherein the liquid-crystalline-side-group polymer formed by combining the mesogenic amine curing agent and uncured epoxy resin in an equivalent weight ratio of 1:1.

* * * * *

UNITED STATES PATENT AND TRADEMARK OFFICE
CERTIFICATE OF CORRECTION

PATENT NO. : 5,093,471
DATED : March 3, 1992
INVENTOR(S) : John L. West

It is certified that error appears in the above-identified patent and that said Letters Patent is hereby corrected as shown below:

Column 1, line 12, insert the following:

---The United States government has a paid-up license in this invention and may have the right in limited circumstances to require the patent owner to license others on reasonable terms as provided for by the terms of contract DARPA/NAVY/ONR Subgrant of N00014-90-J-1559, awarded by the Defense Advanced Research Project Agency.---

Signed and Sealed this

Second Day of March, 1999

Attest:

Q. TODD DICKINSON

*Attesting Officer*    Acting Commissioner of Patents and Trademarks